(12) United States Patent
Xi et al.

(10) Patent No.: US 10,602,344 B2
(45) Date of Patent: Mar. 24, 2020

(54) METHOD AND APPARATUS FOR IDENTIFICATION IN WIRELESS NETWORK, AND DEVICE

(71) Applicant: HUAWEI TECHNOLOGIES CO., LTD., Shenzhen, Guangdong (CN)

(72) Inventors: Qinghua Xi, Shanghai (CN); Dingzhang Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/824,917

(22) Filed: Nov. 28, 2017

(65) Prior Publication Data
US 2018/0084405 A1    Mar. 22, 2018

Related U.S. Application Data

(63) Continuation of application No. PCT/CN2015/080349, filed on May 29, 2015.

(51) Int. Cl.
*H04W 48/08* (2009.01)
*H04W 68/00* (2009.01)
(Continued)

(52) U.S. Cl.
CPC ........... *H04W 8/20* (2013.01); *H04L 61/6054* (2013.01); *H04W 12/08* (2013.01); *H04W 48/08* (2013.01);
(Continued)

(58) Field of Classification Search
CPC ....... H04W 8/20; H04W 76/11; H04W 88/02; H04W 68/02; H04W 68/025;
(Continued)

(56) References Cited

U.S. PATENT DOCUMENTS

| 5,457,680 A * | 10/1995 | Kamm .................... H04W 8/04 370/332 |
| 2007/0155390 A1* | 7/2007 | Kodikara Patabandi .................... H04W 72/1278 455/450 |

(Continued)

FOREIGN PATENT DOCUMENTS

| CN | 1642349 A | 7/2005 |
| CN | 101018413 A | 8/2007 |

(Continued)

OTHER PUBLICATIONS

3GPP TS 25.331 V12.5.0 (Mar. 2015),3rd Generation Partnership Project;Technical Specification Group Radio Access Network;Radio Resource Control (RRC);Protocol specification(Release 12),total 2225 pages.

(Continued)

*Primary Examiner* — Marisol Figueroa
(74) *Attorney, Agent, or Firm* — Fish & Richardson P.C.

(57) ABSTRACT

Embodiments of the present application relate to a method and an apparatus for identification of a device in a wireless network. The method includes: using, by at least one of a user equipment, a terminal device, a radio access network device, or a core network device, an international mobile equipment identity (IMEI) or an extended international mobile subscriber identity (IMSI) as a subscriber identification number.

9 Claims, 6 Drawing Sheets

---

A terminal device receives a first request message sent by a network side device, where the first request message carries an IMEI, and the IMEI is used to identify the terminal device — 101

If determining that the IMEI is the same as an IMEI of the terminal device, the terminal device sends a first response message to the network side device, so that the network side device connects the terminal device to a network according to the first response message — 102

(51) Int. Cl.
*H04W 76/11* (2018.01)
*H04W 8/20* (2009.01)
*H04L 29/12* (2006.01)
*H04W 12/08* (2009.01)
*H04W 84/12* (2009.01)
*H04W 88/02* (2009.01)

(52) U.S. Cl.
CPC .......... *H04W 68/005* (2013.01); *H04W 76/11* (2018.02); *H04W 84/12* (2013.01); *H04W 88/02* (2013.01)

(58) Field of Classification Search
CPC ... H04W 76/10; H04W 48/08; H04W 68/005; H04W 12/08; H04W 84/12; H04L 61/6054
See application file for complete search history.

(56) References Cited

U.S. PATENT DOCUMENTS

| | | | |
|---|---|---|---|
| 2008/0101276 A1 | 5/2008 | Huang et al. | |
| 2011/0244823 A1* | 10/2011 | Chen | H04W 68/00 455/404.1 |
| 2012/0040700 A1* | 2/2012 | Gomes | H04W 4/08 455/500 |
| 2015/0181412 A1* | 6/2015 | Lindholm | H04W 8/26 455/411 |

FOREIGN PATENT DOCUMENTS

| | | |
|---|---|---|
| CN | 101610495 A | 12/2009 |
| CN | 102421098 A | 4/2012 |
| CN | 102740297 A | 10/2012 |
| CN | 103475529 A | 12/2013 |
| EP | 2346291 A1 | 7/2011 |
| EP | 2373101 A1 | 10/2011 |
| WO | 2009123074 A1 | 10/2009 |

OTHER PUBLICATIONS

3GPP Ts 25.331 V12.3.0 (Sep. 2014),3rd Generation Partnership Project;Technical Specification Group Radio Access Network;Radio Resource Control (RRC);Protocol specification(Release 12),total 2204 pages.

3GPP TS 33.102 V12.2.0 (Dec. 2014),3rd Generation Partnership Project;Technical Specification Group Services and System Aspects;3G Security;Security architecture(Release 12),total 76 pages.

International Search Report in International Application No. PCT/CN2015/080349, dated Mar. 1, 2016, 6 pages.

Extended European Search Report issued in European Application No. 15893619.5 dated Apr. 26, 2018, 8 pages.

Office Action issued in Chinese Application No. 201580080413.8, dated Jun. 25, 2019, 35 pages (With English translation).

* cited by examiner

A network side device sends a second request message to a terminal device, where the second request message carries an IMSI, the IMSI is used to identify the terminal device, and the IMSI includes an X-bit MSIN, where X is a positive integer greater than 10 — 401

The network side device receives a second response message sent by the terminal device, where the second response message is a message sent by the terminal device when the terminal device determines that the IMSI is the same as an IMSI of the terminal device — 402

The network side device connects the terminal device to a network according to the second response message — 403

FIG. 4

A terminal device sends a third request message to a network side device, where the third request message carries an IMSI, so that the network side device identifies the terminal device according to the IMSI, and connects the terminal device to a network according to the third request message; the IMSI is used to identify the terminal device; and the IMSI includes an X-bit MSIN, where X is a positive integer greater than 10 — 501

FIG. 5

A network side device receives a third request message sent by a terminal device, where the third request message carries an IMSI, the IMSI is used to identify the terminal device, and the IMSI includes an X-bit MSIN, where X is a positive integer greater than 10 — 601

The network side device connects the terminal device to a network according to the third request message — 602

FIG. 6

A terminal device sends a fourth request message to a network side device, where the fourth request message carries an international mobile equipment identity IMEI, so that the network side device identifies the terminal device according to the IMEI, and connects the terminal device to a network according to the fourth request message; and the IMEI is used to identify the terminal device  ~701

FIG. 7

A network side device receives a fourth request message sent by a terminal device, where the fourth request message carries an IMEI, and the IMEI is used to identify the terminal device  ~801

The network side device connects the terminal device to a network according to the fourth request message  ~802

FIG. 8

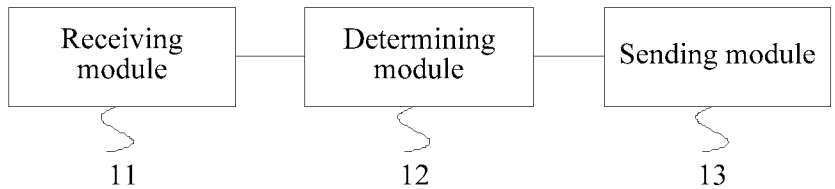

FIG. 9

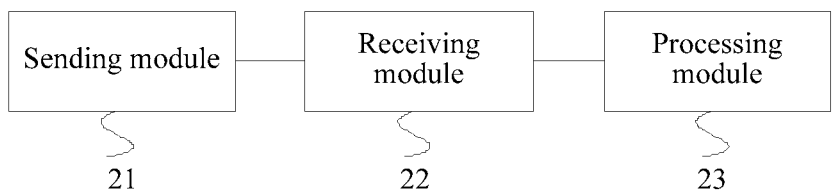

FIG. 10

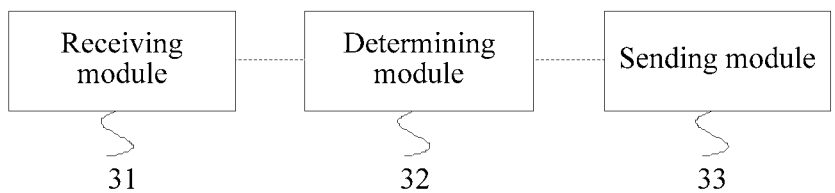

FIG. 11

METHOD AND APPARATUS FOR
IDENTIFICATION IN WIRELESS
NETWORK, AND DEVICE

CROSS-REFERENCE TO RELATED APPLICATIONS

This application is a continuation of International Application No. PCT/CN2015/080349, filed on May 29, 2015, which is hereby incorporated by reference in the entirety.

TECHNICAL FIELD

Embodiments of the present application relate to communications technologies, and in particular, to a method and an apparatus for identification in a wireless network, and a device.

BACKGROUND

An international mobile subscriber identity (IMSI for short) is a symbol for distinguishing between mobile subscribers, stored in a subscriber identity module (SIM for short) card or a universal subscriber identity module (USIM for short) card, and used to identify a mobile subscriber.

In the prior art, when a terminal device accesses a wireless network, first, an IMSI needs to be allocated to the terminal device, so that a network side device correctly identifies the terminal device accessing the wireless network. An IMSI of each terminal device needs to be unique in the whole network and in a global range.

However, each terminal device owns a globally unique IMSI. The IMSI includes a 5-bit public land mobile network (PLMN for short) and a 10-bit mobile subscriber identification number (MSIN for short). The PLMN is used to indicate a different mobile communications operator in a country or a region. The MSIN is used to indicate a mobile subscriber identification number. Therefore, theoretically, only 10 billion terminal devices can be identified in one mobile network. With development of mobile communications networks, machine to machine (M2M for short) communication increases, inevitably resulting in IMSI resource depletion.

SUMMARY

Embodiments of the present application provide a method and an apparatus for identification in a wireless network, and a device, so as to resolve a problem of IMSI resource depletion.

According to a first aspect, an embodiment of the present application provides a method for identification in a wireless network, including:

receiving, by a terminal device, a first request message sent by a network side device, where the first request message carries an international mobile equipment identity IMEI, and the IMEI is used to identify the terminal device; and if the terminal device determines that the IMEI is the same as an IMEI of the terminal device, sending, by the terminal device, a first response message to the network side device, so that the network side device connects the terminal device to a network according to the first response message.

With reference to the first aspect, in a first possible implementation of the first aspect, the IMEI corresponds to the terminal device in a one-to-one manner.

With reference to the first aspect or the first possible implementation of the first aspect, in a second possible implementation of the first aspect, the first request message includes a message in at least one of the following signaling flows: paging, access, service establishment, location area update, routing area update, attach, or detach.

According to a second aspect, an embodiment of the present application provides a method for identification in a wireless network, including:

sending, by a network side device, a first request message to a terminal device, where the first request message carries an international mobile equipment identity IMEI, and the IMEI is used to identify the terminal device;

receiving, by the network side device, a first response message sent by the terminal device, where the first response message is a message sent by the terminal device when the terminal device determines that the IMEI is the same as an IMEI of the terminal device; and connecting, by the network side device, the terminal device to a network according to the first response message.

With reference to the second aspect, in a first possible implementation of the second aspect, the IMEI corresponds to the terminal device in a one-to-one manner.

With reference to the second aspect or the first possible implementation of the second aspect, in a second possible implementation of the second aspect, the first request message includes a message in at least one of the following signaling flows: paging, access, service establishment, location area update, routing area update, attach, or detach.

According to a third aspect, an embodiment of the present application provides a method for identification in a wireless network, including:

receiving, by a terminal device, a second request message sent by a network side device, where the second request message carries an international mobile subscriber identity IMSI, the IMSI is used to identify the terminal device, and the IMSI includes an X-bit mobile subscriber identification number MSIN, where X is a positive integer greater than 10; and if the terminal device determines that the IMSI is the same as an IMSI of the terminal device, sending, by the terminal device, a second response message to the network side device, so that the network side device connects the terminal device to a network according to the second response message.

With reference to the third aspect, in a first possible implementation of the third aspect, the IMSI corresponds to the terminal device in a one-to-one manner.

With reference to the third aspect or the first possible implementation of the third aspect, in a second possible implementation of the third aspect, the second request message includes a message in at least one of the following signaling flows: paging, access, service establishment, location area update, routing area update, attach, or detach.

According to a fourth aspect, an embodiment of the present application provides a method for identification in a wireless network, including:

sending, by a network side device, a second request message to a terminal device, where the second request message carries an international mobile subscriber identity IMSI, the IMSI is used to identify the terminal device, and the IMSI includes an X-bit mobile subscriber identification number MSIN, where X is a positive integer greater than 10;

receiving, by the network side device, a second response message sent by the terminal device, where the second response message is a message sent by the terminal device when the terminal device determines that the IMSI is the same as an IMSI of the terminal device; and connecting, by the network side device, the terminal device to a network according to the second response message.

With reference to the fourth aspect, in a first possible implementation of the fourth aspect, the IMSI corresponds to the terminal device in a one-to-one manner.

With reference to the fourth aspect or the first possible implementation of the fourth aspect, in a second possible implementation of the fourth aspect, the second request message includes a message in at least one of the following signaling flows: paging, access, service establishment, location area update, routing area update, attach, or detach.

According to a fifth aspect, an embodiment of the present application provides a method for identification in a wireless network, including:

sending, by a terminal device, a third request message to a network side device, where the third request message carries an international mobile subscriber identity IMSI, so that the network side device identifies the terminal device according to the IMSI, and connects the terminal device to a network according to the third request message; the IMSI is used to identify the terminal device; and the IMSI includes an X-bit mobile subscriber identification number MSIN, where X is a positive integer greater than 10.

With reference to the fifth aspect, in a first possible implementation of the fifth aspect, the IMSI corresponds to the terminal device in a one-to-one manner.

With reference to the fifth aspect or the first possible implementation of the fifth aspect, in a second possible implementation of the fifth aspect, the third request message includes a message in at least one of the following signaling flows: paging, access, service establishment, location area update, routing area update, attach, or detach.

According to a sixth aspect, an embodiment of the present application provides a method for identification in a wireless network, including:

receiving, by a network side device, a third request message sent by a terminal device, where the third request message carries an international mobile subscriber identity IMSI, the IMSI is used to identify the terminal device, and the IMSI includes an X-bit mobile subscriber identification number MSIN, where X is a positive integer greater than 10; and connecting, by the network side device, the terminal device to a network according to the third request message.

With reference to the sixth aspect, in a first possible implementation of the sixth aspect, the IMSI corresponds to the terminal device in a one-to-one manner.

With reference to the sixth aspect or the first possible implementation of the sixth aspect, in a second possible implementation of the sixth aspect, the third request message includes a message in at least one of the following signaling flows: paging, access, service establishment, location area update, routing area update, attach, or detach.

According to a seventh aspect, an embodiment of the present application provides a method for identification in a wireless network, including: sending, by a terminal device, a fourth request message to a network side device, where the fourth request message carries an international mobile equipment identity IMEI, so that the network side device identifies the terminal device according to the IMEI, and connects the terminal device to a network according to the fourth request message; and the IMEI is used to identify the terminal device.

With reference to the seventh aspect, in a first possible implementation of the seventh aspect, the IMEI corresponds to the terminal device in a one-to-one manner.

With reference to the seventh aspect or the first possible implementation of the seventh aspect, in a second possible implementation of the seventh aspect, the fourth request message includes a message in at least one of the following signaling flows: paging, access, service establishment, location area update, routing area update, attach, or detach.

According to an eighth aspect, an embodiment of the present application provides a method for identification in a wireless network, including:

receiving, by a network side device, a fourth request message sent by a terminal device, where the fourth request message carries an international mobile equipment identity IMEI, and the IMEI is used to identify the terminal device; and connecting, by the network side device, the terminal device to a network according to the fourth request message.

With reference to the eighth aspect, in a first possible implementation of the eighth aspect, the IMEI corresponds to the terminal device in a one-to-one manner.

With reference to the eighth aspect or the first possible implementation of the eighth aspect, in a second possible implementation of the eighth aspect, the fourth request message includes a message in at least one of the following signaling flows: paging, access, service establishment, location area update, routing area update, attach, or detach.

According to a ninth aspect, an embodiment of the present application provides an apparatus for identification in a wireless network, including:

a receiving module, configured to receive a first request message sent by a network side device, where the first request message carries an international mobile equipment identity IMEI, and the IMEI is used to identify a terminal device;

a determining module, configured to determine whether the IMEI is the same as an IMEI of the terminal device; and a sending module, configured to: when the determining module determines that the IMEI is the same as the IMEI of the terminal device, send a first response message to the network side device, so that the network side device connects the terminal device to a network according to the first response message.

With reference to the ninth aspect, in a first possible implementation of the ninth aspect, the IMEI corresponds to the terminal device in a one-to-one manner.

With reference to the ninth aspect or the first possible implementation of the ninth aspect, in a second possible implementation of the ninth aspect, the first request message includes a message in at least one of the following signaling flows: paging, access, service establishment, location area update, routing area update, attach, or detach.

According to a tenth aspect, an embodiment of the present application provides an apparatus for identification in a wireless network, including: a sending module, configured to send a first request message to a terminal device, where the first request message carries an international mobile equipment identity IMEI, and the IMEI is used to identify the terminal device;

a receiving module, configured to receive a first response message sent by the terminal device, where the first response message is a message sent by the terminal device when the terminal device determines that the IMEI is the same as an IMEI of the terminal device; and a processing module, configured to connect the terminal device to a network according to the first response message.

With reference to the tenth aspect, in a first possible implementation of the tenth aspect, the IMEI corresponds to the terminal device in a one-to-one manner.

With reference to the tenth aspect or the first possible implementation of the tenth aspect, in a second possible implementation of the tenth aspect, the first request message includes a message in at least one of the following signaling flows: paging, access, service establishment, location area update, routing area update, attach, or detach.

According to an eleventh aspect, an embodiment of the present application provides an apparatus for identification in a wireless network, including:

a receiving module, configured to receive a second request message sent by a network side device, where the second request message carries an international mobile subscriber identity IMSI, the IMSI is used to identify the terminal device, and the IMSI includes an X-bit mobile subscriber identification number MSIN, where X is a positive integer greater than 10; a determining module, configured to determine whether the IMSI is the same as an IMSI of the terminal device; and a sending module, configured to: when the determining module determines that the IMSI is the same as the IMSI of the terminal device, send a second response message to the network side device, so that the network side device connects the terminal device to a network according to the second response message.

With reference to the eleventh aspect, in a first possible implementation of the eleventh aspect, the IMSI corresponds to the terminal device in a one-to-one manner.

With reference to the eleventh aspect or the first possible implementation of the eleventh aspect, in a second possible implementation of the eleventh aspect, the second request message includes a message in at least one of the following signaling flows: paging, access, service establishment, location area update, routing area update, attach, or detach.

According to a twelfth aspect, an embodiment of the present application provides an apparatus for identification in a wireless network, including:

a sending module, configured to send a second request message to a terminal device, where the second request message carries an international mobile subscriber identity IMSI, the IMSI is used to identify the terminal device, and the IMSI includes an X-bit mobile subscriber identification number MSIN, where X is a positive integer greater than 10;

a receiving module, configured to receive a second response message sent by the terminal device, where the second response message is a message sent by the terminal device when the terminal device determines that the IMSI is the same as an IMSI of the terminal device; and a processing module, configured to connect the terminal device to a network according to the second response message.

With reference to the twelfth aspect, in a first possible implementation of the twelfth aspect, the IMSI corresponds to the terminal device in a one-to-one manner.

With reference to the twelfth aspect or the first possible implementation of the twelfth aspect, in a second possible implementation of the twelfth aspect, the second request message includes a message in at least one of the following signaling flows: paging, access, service establishment, location area update, routing area update, attach, or detach.

According to a thirteenth aspect, an embodiment of the present application provides an apparatus for identification in a wireless network, including:

a sending module, configured to send a third request message to a network side device, where the third request message carries an international mobile subscriber identity IMSI, so that the network side device identifies a terminal device according to the IMSI, and connects the terminal device to a network according to the third request message; the IMSI is used to identify the terminal device; and the IMSI includes an X-bit mobile subscriber identification number MSIN, where X is a positive integer greater than 10.

With reference to the thirteenth aspect, in a first possible implementation of the thirteenth aspect, the IMSI corresponds to the terminal device in a one-to-one manner.

With reference to the thirteenth aspect or the first possible implementation of the thirteenth aspect, in a second possible implementation of the thirteenth aspect, the third request message includes a message in at least one of the following signaling flows: paging, access, service establishment, location area update, routing area update, attach, or detach.

According to a fourteenth aspect, an embodiment of the present application provides an apparatus for identification in a wireless network, including:

a receiving module, configured to receive a third request message sent by a terminal device, where the third request message carries an international mobile subscriber identity IMSI, the IMSI is used to identify the terminal device, and the IMSI includes an X-bit mobile subscriber identification number MSIN, where X is a positive integer greater than 10; and a processing module, configured to connect the terminal device to a network according to the third request message.

With reference to the fourteenth aspect, in a first possible implementation of the fourteenth aspect, the IMSI corresponds to the terminal device in a one-to-one manner.

With reference to the fourteenth aspect or the first possible implementation of the fourteenth aspect, in a second possible implementation of the fourteenth aspect, the third request message includes a message in at least one of the following signaling flows: paging, access, service establishment, location area update, routing area update, attach, or detach.

According to a fifteenth aspect, an embodiment of the present application provides an apparatus for identification in a wireless network, including:

a sending module, configured to send a fourth request message to a network side device, where the fourth request message carries an international mobile equipment identity IMEI, so that the network side device identifies a terminal device according to the IMEI, and connects the terminal device to a network according to the fourth request message; and the IMEI is used to identify the terminal device.

With reference to the fifteenth aspect, in a first possible implementation of the fifteenth aspect, the IMEI corresponds to the terminal device in a one-to-one manner.

With reference to the fifteenth aspect or the first possible implementation of the fifteenth aspect, in a second possible implementation of the fifteenth aspect, the fourth request message includes a message in at least one of the following signaling flows: paging, access, service establishment, location area update, routing area update, attach, or detach.

According to a sixteenth aspect, an embodiment of the present application provides an apparatus for identification in a wireless network, including:

a receiving module, configured to receive a fourth request message sent by a terminal device, where the fourth request message carries an international mobile equipment identity IMEI, and the IMEI is used to identify the terminal device; and a processing module, configured to connect the terminal device to a network according to the fourth request message.

With reference to the sixteenth aspect, in a first possible implementation of the sixteenth aspect, the IMEI corresponds to the terminal device in a one-to-one manner.

With reference to the sixteenth aspect or the first possible implementation of the sixteenth aspect, in a second possible implementation of the sixteenth aspect, the fourth request message includes a message in at least one of the following signaling flows: paging, access, service establishment, location area update, routing area update, attach, or detach.

According to a seventeenth aspect, an embodiment of the present application provides a terminal device, including:

a receiver, configured to receive a first request message sent by a network side device, where the first request message carries an international mobile equipment identity IMEI, and the IMEI is used to identify the terminal device;

a processor, configured to determine whether the IMEI is the same as an IMEI of the terminal device; and a transmitter, configured to: when the processor determines that the IMEI is the same as the IMEI of the terminal device, send a first response message to the network side device, so that the network side device connects the terminal device to a network according to the first response message.

With reference to the seventeenth aspect, in a first possible implementation of the seventeenth aspect, the IMEI corresponds to the terminal device in a one-to-one manner.

With reference to the seventeenth aspect or the first possible implementation of the seventeenth aspect, in a second possible implementation of the seventeenth aspect, the first request message includes a message in at least one of the following signaling flows: paging, access, service establishment, location area update, routing area update, attach, or detach.

According to an eighteenth aspect, an embodiment of the present application provides a network side device, including:

a transmitter, configured to send a first request message to a terminal device, where the first request message carries an international mobile equipment identity IMEI, and the IMEI is used to identify the terminal device;

a receiver, configured to receive a first response message sent by the terminal device, where the first response message is a message sent by the terminal device when the terminal device determines that the IMEI is the same as an IMEI of the terminal device; and a processor, configured to connect the terminal device to a network according to the first response message.

With reference to the eighteenth aspect, in a first possible implementation of the eighteenth aspect, the IMEI corresponds to the terminal device in a one-to-one manner.

With reference to the eighteenth aspect or the first possible implementation of the eighteenth aspect, in a second possible implementation of the eighteenth aspect, the first request message includes a message in at least one of the following signaling flows: paging, access, service establishment, location area update, routing area update, attach, or detach.

According to a nineteenth aspect, an embodiment of the present application provides a terminal device, including:

a receiver, configured to receive a second request message sent by a network side device, where the second request message carries an international mobile subscriber identity IMSI, the IMSI is used to identify the terminal device, and the IMSI includes an X-bit mobile subscriber identification number MSIN, where X is a positive integer greater than 10;

a processor, configured to determine whether the IMSI is the same as an IMSI of the terminal device; and a transmitter, configured to: when the processor determines that the IMSI is the same as the IMSI of the terminal device, send a second response message to the network side device, so that the network side device connects the terminal device to a network according to the second response message.

With reference to the nineteenth aspect, in a first possible implementation of the nineteenth aspect, the IMSI corresponds to the terminal device in a one-to-one manner.

With reference to the nineteenth aspect or the first possible implementation of the nineteenth aspect, in a second possible implementation of the nineteenth aspect, the second request message includes a message in at least one of the following signaling flows: paging, access, service establishment, location area update, routing area update, attach, or detach.

According to a twentieth aspect, an embodiment of the present application provides a network side device, including:

a transmitter, configured to send a second request message to a terminal device, where the second request message carries an international mobile subscriber identity IMSI, the IMSI is used to identify the terminal device, and the IMSI includes an X-bit mobile subscriber identification number MSIN, where X is a positive integer greater than 10;

a receiver, configured to receive a second response message sent by the terminal device, where the second response message is a message sent by the terminal device when the terminal device determines that the IMSI is the same as an IMSI of the terminal device; and a processor, configured to connect the terminal device to a network according to the second response message.

With reference to the twentieth aspect, in a first possible implementation of the twentieth aspect, the IMSI corresponds to the terminal device in a one-to-one manner.

With reference to the twentieth aspect or the first possible implementation of the twentieth aspect, in a second possible implementation of the twentieth aspect, the second request message includes a message in at least one of the following signaling flows: paging, access, service establishment, location area update, routing area update, attach, or detach.

According to a twenty-first aspect, an embodiment of the present application provides a terminal device, including:

a transmitter, configured to send a third request message to a network side device, where the third request message carries an international mobile subscriber identity IMSI, so that the network side device identifies the terminal device according to the IMSI, and connects the terminal device to a network according to the third request message; the IMSI is used to identify the terminal device; and the IMSI includes an X-bit mobile subscriber identification number MSIN, where X is a positive integer greater than 10.

With reference to the twenty-first aspect, in a first possible implementation of the twenty-first aspect, the IMSI corresponds to the terminal device in a one-to-one manner.

With reference to the twenty-first aspect or the first possible implementation of the twenty-first aspect, in a second possible implementation of the twenty-first aspect, the third request message includes a message in at least one of the following signaling flows: paging, access, service establishment, location area update, routing area update, attach, or detach.

According to a twenty-second aspect, an embodiment of the present application provides a network side device, including:

a receiver, configured to receive a third request message sent by a terminal device, where the third request message carries an international mobile subscriber identity IMSI, the IMSI is used to identify the terminal device, and the IMSI includes an X-bit mobile subscriber identification number MSIN, where X is a positive integer greater than 10; and a processor, configured to connect the terminal device to a network according to the third request message.

With reference to the twenty-second aspect, in a first possible implementation of the twenty-second aspect, the IMSI corresponds to the terminal device in a one-to-one manner.

With reference to the twenty-second aspect or the first possible implementation of the twenty-second aspect, in a second possible implementation of the twenty-second aspect, the third request message includes a message in at least one of the following signaling flows: paging, access, service establishment, location area update, routing area update, attach, or detach.

According to a twenty-third aspect, an embodiment of the present application provides a terminal device, including:

a transmitter, configured to send a fourth request message to a network side device, where the fourth request message carries an international mobile equipment identity IMEI, so that the network side device identifies the terminal device according to the IMEI, and connects the terminal device to a network according to the fourth request message; and the IMEI is used to identify the terminal device.

With reference to the twenty-third aspect, in a first possible implementation of the twenty-third aspect, the IMEI corresponds to the terminal device in a one-to-one manner.

With reference to the twenty-third aspect or the first possible implementation of the twenty-third aspect, in a second possible implementation of the twenty-third aspect, the fourth request message includes a message in at least one of the following signaling flows: paging, access, service establishment, location area update, routing area update, attach, or detach.

According to a twenty-fourth aspect, an embodiment of the present application provides a network side device, including:

a receiver, configured to receive a fourth request message sent by a terminal device, where the fourth request message carries an international mobile equipment identity IMEI, and the IMEI is used to identify the terminal device; and a processor, configured to connect the terminal device to a network according to the fourth request message.

With reference to the twenty-fourth aspect, in a first possible implementation of the twenty-fourth aspect, the IMEI corresponds to the terminal device in a one-to-one manner.

With reference to the twenty-fourth aspect or the first possible implementation of the twenty-fourth aspect, in a second possible implementation of the twenty-fourth aspect, the fourth request message includes a message in at least one of the following signaling flows: paging, access, service establishment, location area update, routing area update, attach, or detach.

By means of the method and apparatus for identification in a wireless network, and the device that are provided in the embodiments of the present application, a terminal device receives a first request message that is sent by a network side device and that carries an IMEI, and sends a first response message to the network side device when determining that the IMEI is the same as an IMEI of the terminal device, so that the network side device connects the terminal device to a network according to the first response message. The terminal device is identified by using the IMEI. Therefore, IMSI resource depletion may be avoided, and the terminal device can be normally identified for normal communication.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIG. 4 is a schematic flowchart of Embodiment 4 of a method for identification in a wireless network according to the present application;

FIG. 5 is a schematic flowchart of Embodiment 5 of a method for identification in a wireless network according to the present application;

FIG. 6 is a schematic flowchart of Embodiment 6 of a method for identification in a wireless network according to the present application;

FIG. 7 is a schematic flowchart of Embodiment 7 of a method for identification in a wireless network according to the present application;

FIG. 8 is a schematic flowchart of Embodiment 8 of a method for identification in a wireless network according to the present application;

FIG. 9 is a schematic structural diagram of Embodiment 1 of an apparatus for identification in a wireless network according to the present application;

FIG. 10 is a schematic structural diagram of Embodiment 2 of an apparatus for identification in a wireless network according to the present application;

FIG. 11 is a schematic structural diagram of Embodiment 3 of an apparatus for identification in a wireless network according to the present application;

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

A method provided in the embodiments of the present application may be applied to wireless networks in different standards, for example, Universal Mobile Telecommunications System (UMTS for short), Global System for Mobile Communications (GSM for short), Code Division Multiple Access (CDMA for short), CDMA2000, Wideband Code Division Multiple Access (WCDMA for short), Time Division-Synchronous Code Division Multiple Access (TD-SCDMA for short), a Long Term Evolution (LTE) system, or a subsequent evolved system of LTE.

Figure 1:
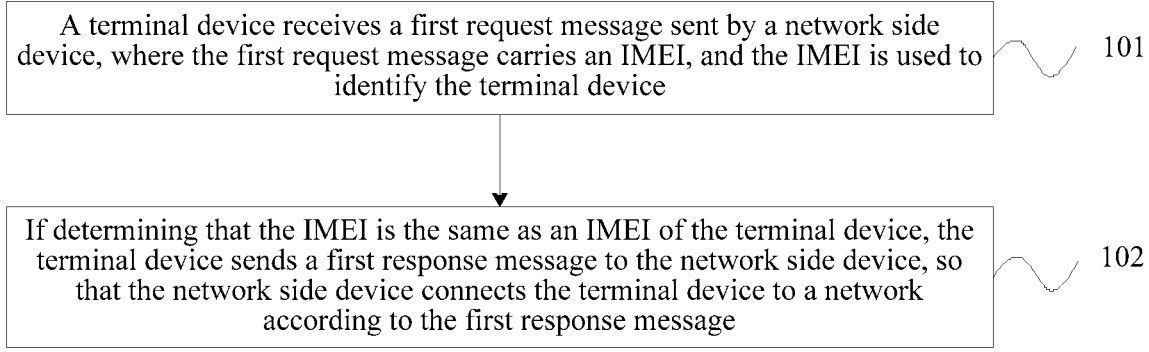
FIG. 1 is a schematic flowchart of Embodiment 1 of a method for identification in a wireless network according to the present application.

FIG. 1 is a schematic flowchart of Embodiment 1 of a method for identification in a wireless network according to the present application. This embodiment of the present application provides a method for identification in a wireless network. The method may be performed by any apparatus for performing a method for identification in a wireless network. The apparatus may be implemented by using software and/or hardware. In this embodiment, the apparatus may be integrated into a terminal device. As shown in FIG. 1, the method in this embodiment may include the following steps.

Step 101: A terminal device receives a first request message sent by a network side device, where the first request message carries an IMEI, and the IMEI is used to identify the terminal device.

In the prior art, using a UMTS communications network as an example for description, in a paging signaling flow, the first request message sent by the network side device to the terminal device includes an IMSI, or a temporary mobile subscriber identity (TMSI for short), or a packet temporary mobile subscriber identity (PTMSI for short).

The IMSI includes a 5-bit PLMN and a 10-bit mobile subscriber identification number (MSIN for short). The PLMN is used to indicate a mobile communications operator different from another in a country or a region. The MSIN is used to indicate a mobile subscriber identification number. Therefore, theoretically, only 10 billion terminal devices can be identified in one mobile network. Consequently, with continuous development of M2M applications, a problem of IMSI resource depletion may occur.

To resolve the problem, in this embodiment, the first request message sent by the network side device to the terminal device includes the international mobile equipment identity (IMEI for short). The terminal device is identified by using the IMEI, so that the problem of IMSI resource depletion can be resolved or relieved.

In addition, the first request message includes a message in at least one of the following signaling flows: paging, access, service establishment, location area update, routing area update, attach, or detach. Specifically, the first request message may be at least one message in at least one of the foregoing signaling flows. For example, the first request message may be a paging message or an access message, or may be any other messages carrying the IMEI. Using the UMTS communications network as an example, in the paging signaling flow, the first request message may be a paging (Paging) message, and the paging message carries the IMEI. A specific form of the first request message is not limited in the present application.

Step 102: If determining that the IMEI is the same as an IMEI of the terminal device, the terminal device sends a first response message to the network side device, so that the network side device connects the terminal device to a network according to the first response message.

In this embodiment, after being assembled, each terminal device is assigned a globally unique number, that is, the IMEI. Therefore, the IMEI corresponds to the terminal device in a one-to-one manner. After receiving the IMEI sent by the network side device, the terminal device compares the received IMEI with the IMEI of the terminal device. If the terminal device finds that the received IMEI is the same as the IMEI of the terminal device, it indicates that the first request message sent by the network side device is sent to the terminal device, and the terminal device may return the first response message to the network side device. In this embodiment, using a UMTS communications network as an example for description, in a paging signaling flow, the first response message may be, for example, a radio resource control (RRC for short) connection request message. The network side device returns an RRC connection establishment message to the terminal device according to the received first response message. After receiving the RRC connection establishment message sent by the network side device, the terminal device sends an RRC connection establishment completion message to the network side device according to the RRC connection establishment message, indicating that the terminal device is connected to a wireless network.

By means of the method for identification in a wireless network that is provided in this embodiment of the present application, a terminal device receives a first request message that is sent by a network side device and that carries an IMEI, and sends a first response message to the network side devices when determining that the IMEI is the same as an IMEI of the terminal device, so that the network side device connects the terminal device to a network according to the first response message. The terminal device is identified by using the IMEI. Therefore, IMSI resource depletion may be avoided, and the terminal device can be normally identified for normal communication.

Figure 2:
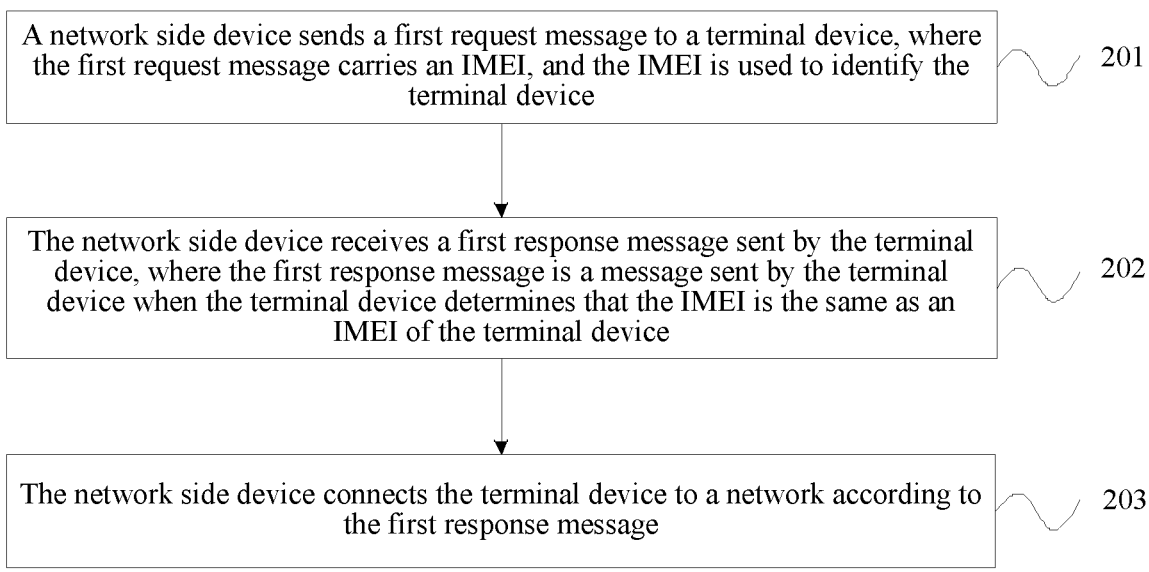
FIG. 2 is a schematic flowchart of Embodiment 2 of a method for identification in a wireless network according to the present application.

FIG. 2 is a schematic flowchart of Embodiment 2 of a method for identification in a wireless network according to the present application. This embodiment of the present application provides a method for identification in a wireless network. The method may be performed by any apparatus for performing a method for identification in a wireless network. The apparatus may be implemented by using software and/or hardware. In this embodiment, the apparatus may be integrated into a network side device. As shown in FIG. 2, the method in this embodiment may include the following steps.

Step 201: A network side device sends a first request message to a terminal device, where the first request message carries an IMEI, and the IMEI is used to identify the terminal device.

In this embodiment, the network side device sends the first request message to the terminal device. The first request message includes the IMEI. The first request message includes a message in at least one of the following signaling flows: paging, access, service establishment, location area update, routing area update, attach, or detach. Specifically, the first request message may be at least one message in at least one of the foregoing signaling flows. For example, the first request message may be a paging message or an access message, or may be any other messages carrying the IMEI. Using a UMTS communications network as an example, in a paging signaling flow, the first request message may be a paging (Paging) message, and the paging message carries the IMEI. A specific form of the first request message is not limited in the present application.

Step 202: The network side device receives a first response message sent by the terminal device, where the first response message is a message sent by the terminal device when the terminal device determines that the IMEI is the same as an IMEI of the terminal device.

In this embodiment, after being assembled, each terminal device is assigned a globally unique IMEI. Therefore, the IMEI corresponds to the terminal device in a one-to-one manner. After receiving the IMEI sent by the network side device, the terminal device compares the received IMEI with the IMEI of the terminal device. If the terminal device finds that the received IMEI is the same as the IMEI of the terminal device, it indicates that the first request message sent by the network side device is sent to the terminal device, and the terminal device returns the first response message to the network side device.

Step 203: The network side device connects the terminal device to a network according to the first response message.

In this embodiment, using a UMTS communications network as an example for description, in a paging signaling flow, the first response message may be, for example, an RRC connection request message. After receiving the first response message returned by the terminal device, the network side device may learn that the terminal device already finds that the first request message sent by the network side device is sent to the terminal device, and the network side device returns an RRC connection establishment message to the terminal device. After receiving the RRC connection establishment message sent by the network side device, the terminal device sends an RRC connection establishment completion message to the network side device according to the RRC connection establishment message, indicating that the terminal device is connected to a wireless network.

By means of the method for identification in a wireless network that is provided in this embodiment of the present application, a network side device sends, to a terminal device, a first request message carrying an IMEI, receives a first response message sent by the terminal device, and connects the terminal device to a network according to the received first response message. The terminal device is identified by using the IMEI. Therefore, IMSI resource depletion may be avoided, and the terminal device can be normally identified for normal communication.

Figure 3:
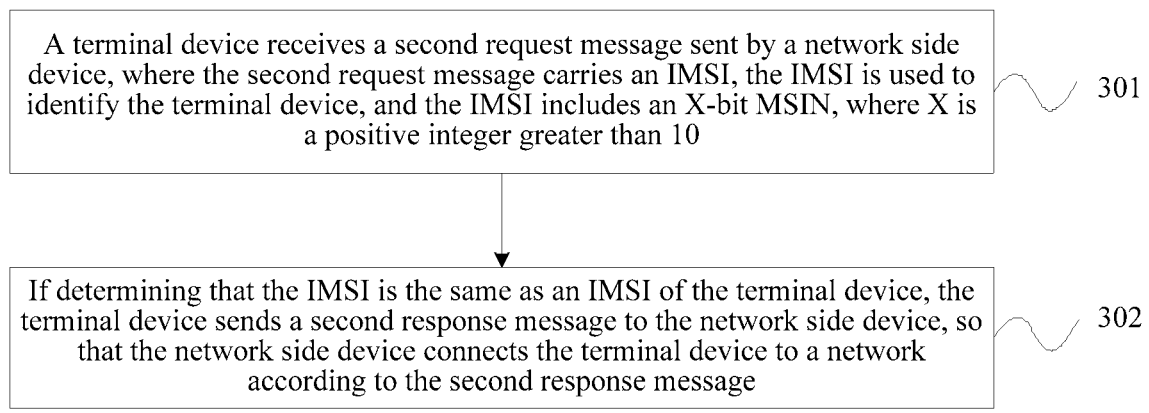
FIG. 3 is a schematic flowchart of Embodiment 3 of a method for identification in a wireless network according to the present application.

FIG. 3 is a schematic flowchart of Embodiment 3 of a method for identification in a wireless network according to the present application. This embodiment of the present application provides a method for identification in a wireless network. The method may be performed by any apparatus for performing a method for identification in a wireless network. The apparatus may be implemented by using software and/or hardware. In this embodiment, the apparatus may be integrated into a terminal device. As shown in FIG. 3, the method in this embodiment may include the following steps.

Step 301: A terminal device receives a second request message sent by a network side device, where the second request message carries an IMSI, the IMSI is used to identify the terminal device, and the IMSI includes an X-bit MSIN, where X is a positive integer greater than 10.

In the prior art, using a UMTS communications network as an example for description, in a paging signaling flow, the second request message sent by the network side device to the terminal device includes the IMSI, or a TMSI, or a PTMSI.

The IMSI includes a 5-bit PLMN and a 10-bit MSIN. The PLMN is used to indicate a mobile communications operator different from another in a country or a region. The MSIN is used to indicate a mobile subscriber identification number. Therefore, theoretically, only 10 billion terminal devices can be identified in one mobile network. Consequently, with continuous development of M2M applications, a problem of IMSI resource depletion may occur.

To resolve the problem, in this embodiment, a quantity of bits of the MSIN in the IMSI is extended, so that the quantity of bits of the MSIN is greater than 10 bits. Therefore, more terminal devices may be identified by using the IMSI. In this way, the problem of IMSI resource depletion can be resolved or relieved.

In addition, the second request message includes a message in at least one of the following signaling flows: paging, access, service establishment, location area update, routing area update, attach, or detach. Specifically, the second request message may be at least one message in at least one of the foregoing signaling flows. For example, the second request message may be a paging message or an access message, or may be any other messages carrying the IMSI. The IMSI includes an X-bit MSIN. X is a positive integer greater than 10. Using the UMTS communications network as an example, in the paging signaling flow, the second request message may be a paging (Paging) message, the paging message carries the IMSI, and the IMSI includes the MSIN having more than 10 bits. A specific form of the second request message is not limited in the present application.

Step 302: If determining that the IMSI is the same as an IMSI of the terminal device, the terminal device sends a second response message to the network side device, so that the network side device connects the terminal device to a network according to the second response message.

In this embodiment, each terminal device has a globally unique IMSI. Therefore, the IMSI corresponds to the terminal device in a one-to-one manner. After receiving the IMSI sent by the network side device, the terminal device compares the received IMSI with the IMSI stored in the terminal device. If the terminal device finds that the received IMSI is the same as the IMSI of the terminal device, it indicates that the second request message sent by the network side device is sent to the terminal device, and the terminal device may return the second response message to the network side device. In this embodiment, using a UMTS communications network as an example for description, in a paging signaling flow, the second response message may be, for example, an RRC connection request message. The network side device returns an RRC connection establishment message to the terminal device according to the received second response message.

After receiving the RRC connection establishment message sent by the network side device, the terminal device sends an RRC connection establishment completion message to the network side device according to the RRC connection establishment message, indicating that the terminal device is connected to a wireless network.

By means of the method for identification in a wireless network that is provided in this embodiment of the present application, a terminal device receives a second request message that is sent by a network side device and that carries an IMSI, and sends a second response message to the network side devices when determining that the IMSI is the same as an IMSI of the terminal device, so that the network side device connects the terminal device to a network according to the second response message. A quantity of bits of an MSIN in the IMSI is extended, so that the IMSI may identify more terminal devices. Therefore, a phenomenon of IMSI resource depletion is avoided, and the terminal device can be normally identified for normal communication.

FIG. 4 is a schematic flowchart of Embodiment 4 of a method for identification in a wireless network according to the present application. This embodiment of the present application provides a method for identification in a wireless network. The method may be performed by any apparatus for performing a method for identification in a wireless network. The apparatus may be implemented by using software and/or hardware. In this embodiment, the apparatus may be integrated into a network side device. As shown in FIG. 4, the method in this embodiment may include the following steps.

Step 401: A network side device sends a second request message to a terminal device, where the second request message carries an IMSI, the IMSI is used to identify the terminal device, and the IMSI includes an X-bit MSIN, where X is a positive integer greater than 10.

In this embodiment, a quantity of bits of the MSIN in the IMSI is extended, so that the quantity of bits of the MSIN is greater than 10 bits. Therefore, more terminal devices may be identified by using the IMSI. In this way, a problem of IMSI resource depletion can be resolved or relieved.

The second request message includes a message in at least one of the following signaling flows: paging, access, service establishment, location area update, routing area update, attach, or detach. Specifically, the second request message may be at least one message in at least one of the foregoing signaling flows. For example, the second request message may be a paging message or an access message, or may be any other messages carrying the IMSI. The IMSI includes an X-bit MSIN. X is a positive integer greater than 10. Using a UMTS communications network as an example, in a paging signaling flow, the second request message may be a paging (Paging) message, the paging message carries the IMSI, and the IMSI includes the MSIN having more than 10 bits. A specific form of the second request message is not limited in the present application.

Step 402: The network side device receives a second response message sent by the terminal device, where the second response message is a message sent by the terminal device when the terminal device determines that the IMSI is the same as an IMSI of the terminal device.

In this embodiment, each terminal device has a globally unique IMSI. Therefore, the IMSI corresponds to the terminal device in a one-to-one manner. After receiving the IMSI sent by the network side device, the terminal device compares the received IMSI with the IMSI stored in the terminal device. If the terminal device finds that the received IMSI is the same as the IMSI of the terminal device, it indicates that the second request message sent by the network side device is sent to the terminal device, and the terminal device returns the second response message to the network side device.

Step 403: The network side device connects the terminal device to a network according to the second response message.

In this embodiment, using a UMTS communications network as an example for description, in a paging signaling flow, the second response message may be, for example, an RRC connection request message. After receiving the second response message returned by the terminal device, the network side device may learn that the terminal device already finds that the received second request message is sent to the terminal device, and the network side device returns an RRC connection establishment message to the terminal device. After receiving the RRC connection establishment message sent by the network side device, the terminal device sends an RRC connection establishment completion message to the network side device according to the RRC connection establishment message, indicating that the terminal device is connected to a wireless network.

By means of the method for identification in a wireless network that is provided in this embodiment of the present application, a network side device sends, to a terminal device, a second request message carrying an IMSI, receives a second response message that is sent by the terminal device to the network side device when the terminal device determines that the IMSI is the same as an IMSI of the terminal device, and connects the terminal device to a network according to the second response message. A quantity of bits of an MSIN in the IMSI is extended, so that the IMSI may identify more terminal devices. Therefore, a phenomenon of IMSI resource depletion is avoided, and the terminal device can be normally identified for normal communication.

FIG. 5 is a schematic flowchart of Embodiment 5 of a method for identification in a wireless network according to the present application. This embodiment of the present application provides a method for identification in a wireless network. The method may be performed by any apparatus for performing a method for identification in a wireless network. The apparatus may be implemented by using software and/or hardware. In this embodiment, the apparatus may be integrated into a terminal device. As shown in FIG. 5, the method in this embodiment may include the following step:

Step 501: A terminal device sends a third request message to a network side device, where the third request message carries an IMSI, so that the network side device identifies the terminal device according to the IMSI, and connects the terminal device to a network according to the third request message; the IMSI is used to identify the terminal device; and the IMSI includes an X-bit MSIN, where X is a positive integer greater than 10.

In the prior art, using a UMTS communications network as an example for description, in a paging signaling flow, the third request message sent by the terminal device to the network side device includes the IMSI, or a TMSI, or a PTMSI.

The IMSI includes a 5-bit PLMN and a 10-bit MSIN. The PLMN is used to indicate a mobile communications operator different from another in a country or a region. The MSIN is used to indicate a mobile subscriber identification number. Therefore, theoretically, only 10 billion terminal devices can be identified in one mobile network. Consequently, with continuous development of M2M applications, a problem of IMSI resource depletion may occur.

To resolve the problem, in this embodiment, a quantity of bits of the MSIN in the IMSI is extended, so that the quantity of bits of the MSIN is greater than 10 bits. Therefore, more terminal devices may be identified by using the IMSI. In this way, the problem of IMSI resource depletion can be resolved or relieved.

Each terminal device has a globally unique IMSI. Therefore, the IMSI corresponds to the terminal device in a one-to-one manner. After receiving the IMSI sent by the terminal device, the network side device identifies the terminal device according to the IMSI, and connects the terminal device to the network according to the third request message. In addition, the network side device may further return a third response message to the terminal device, to notify the terminal device that the terminal device is already connected to the network.

In addition, the third request message includes a message in at least one of the following signaling flows: paging, access, service establishment, location area update, routing area update, attach, or detach. Specifically, the third request message may be at least one message in at least one of the foregoing signaling flows. For example, the third request message may be a paging message or an access message, or may be any other messages carrying the IMSI. The IMSI includes an X-bit MSIN. X is a positive integer greater than 10. Using the UMTS communications network as an example, in the paging signaling flow, the third request message may be a paging (Paging) message, the paging message carries the IMSI, and the IMSI includes the MSIN having more than 10 bits. A specific form of the third request message is not limited in the present application.

By means of the method for identification in a wireless network that is provided in this embodiment of the present application, a terminal device sends, to a network side device, a third request message carrying an IMSI, so that the network side device connects the terminal device to a network according to the third request message. A quantity of bits of an MSIN in the IMSI is extended, so that the IMSI may identify more terminal devices. Therefore, a phenomenon of IMSI resource depletion is avoided, and the terminal device can be normally identified for normal communication.

FIG. 6 is a schematic flowchart of Embodiment 6 of a method for identification in a wireless network according to the present application. This embodiment of the present application provides a method for identification in a wireless network. The method may be performed by any apparatus for performing a method for identification in a wireless network. The apparatus may be implemented by using software and/or hardware. In this embodiment, the apparatus may be integrated into a network side device. As shown in FIG. 6, the method in this embodiment may include the following steps.

Step 601: A network side device receives a third request message sent by a terminal device, where the third request message carries an IMSI, the IMSI is used to identify the terminal device, and the IMSI includes an X-bit MSIN, where X is a positive integer greater than 10.

In this embodiment, a quantity of bits of the MSIN in the IMSI is extended, so that the quantity of bits of the MSIN is greater than 10 bits. Therefore, more terminal devices may be identified by using the IMSI. In this way, a problem of IMSI resource depletion can be resolved or relieved.

The third request message includes a message in at least one of the following signaling flows: paging, access, service establishment, location area update, routing area update, attach, or detach. Specifically, the third request message may be at least one message in at least one of the foregoing signaling flows. For example, the third request message may be a paging message or an access message, or may be any other messages carrying the IMSI. The IMSI includes an X-bit MSIN. X is a positive integer greater than 10. Using a UMTS communications network as an example, in a paging signaling flow, the third request message may be a paging (Paging) message, the paging message carries the IMSI, and the IMSI includes the MSIN having more than 10 bits. A specific form of the third request message is not limited in the present application.

Step 602: The network side device connects the terminal device to a network according to the third request message.

In this embodiment, each terminal device has a globally unique IMSI. Therefore, the IMSI corresponds to the terminal device in a one-to-one manner. After receiving the third request message that is sent by the terminal device and that carries the IMSI, the network side device identifies the terminal device according to the IMSI, and connects the terminal device to the network according to the third request message. In addition, the network side device may further send a third response message to the terminal device, to notify the terminal device that the terminal device is already connected to the network.

By means of the method for identification in a wireless network that is provided in this embodiment of the present application, a network side device receives a third request message that is sent by a terminal device and that carries an IMSI, and connects the terminal device to a network according to the third request message. A quantity of bits of an MSIN in the IMSI is extended, so that the IMSI may identify more terminal devices. Therefore, a phenomenon of IMSI resource depletion is avoided, and the terminal device can be normally identified for normal communication.

FIG. 7 is a schematic flowchart of Embodiment 7 of a method for identification in a wireless network according to the present application. This embodiment of the present application provides a method for identification in a wireless network. The method may be performed by any apparatus for performing a method for identification in a wireless network. The apparatus may be implemented by using software and/or hardware. In this embodiment, the apparatus may be integrated into a terminal device. As shown in FIG. 7, the method in this embodiment may include the following step:

Step 701: A terminal device sends a fourth request message to a network side device, where the fourth request message carries an international mobile equipment identity IMEI, so that the network side device identifies the terminal device according to the IMEI, and connects the terminal device to a network according to the fourth request message; and the IMEI is used to identify the terminal device.

In the prior art, using a UMTS communications network as an example for description, in a paging signaling flow, the fourth request message sent by the terminal device to the network side device includes an IMSI, or a TMSI, or a PTMSI. The IMSI includes a 5-bit PLMN and a 10-bit MSIN. The PLMN is used to indicate a mobile communications operator different from another in a country or a region. The MSIN is used to indicate a mobile subscriber identification number. Therefore, theoretically, only 10 billion terminal devices can be identified in one mobile network. Consequently, with continuous development of M2M applications, a problem of IMSI resource depletion may occur.

To resolve the problem, in this embodiment, the fourth request message sent by the terminal device to the network side device includes the IMEI. The terminal device is identified by using the IMEI, so that the problem of IMSI resource depletion can be resolved or relieved.

After being assembled, each terminal device is assigned a globally unique number, that is, the IMEI. Therefore, the IMEI corresponds to the terminal device in a one-to-one manner. After receiving the IMEI sent by the terminal device, the network side device identifies the terminal device according to the IMEI, and connects the terminal device to the network according to the fourth request message. In addition, the network side device may further return a fourth response message to the terminal device, to notify the terminal device that the terminal device is already connected to the network.

In addition, the fourth request message includes a message in at least one of the following signaling flows: paging, access, service establishment, location area update, routing area update, attach, or detach. Specifically, the fourth request message may be at least one message in at least one of the foregoing signaling flows. For example, the fourth request message may be a paging message or an access message, or may be any other messages carrying the IMEI. Using the UMTS communications network as an example, in the paging signaling flow, the fourth request message may be a paging (Paging) message, and the paging message carries the IMEI. A specific form of the fourth request message is not limited in the present application.

By means of the method for identification in a wireless network that is provided in this embodiment of the present application, a terminal device sends, to a network side device, a fourth request message carrying an IMEI, so that the network side device identifies the terminal device according to the IMEI, and connects the terminal device to a network according to the fourth request message. The terminal device is identified by using the IMEI. Therefore, IMSI resource depletion may be avoided, and the terminal device can be normally identified for normal communication.

FIG. 8 is a schematic flowchart of Embodiment 8 of a method for identification in a wireless network according to the present application. This embodiment of the present application provides a method for identification in a wireless network. The method may be performed by any apparatus for performing a method for identification in a wireless network. The apparatus may be implemented by using software and/or hardware. In this embodiment, the apparatus may be integrated into a network side device. As shown in FIG. 8, the method in this embodiment may include the following steps.

Step 801: A network side device receives a fourth request message sent by a terminal device, where the fourth request message carries an IMEI, and the IMEI is used to identify the terminal device.

In this embodiment, the terminal device sends the fourth request message to the network side device. The fourth request message includes the IMEI. The fourth request message includes a message in at least one of the following signaling flows: paging, access, service establishment, location area update, routing area update, attach, or detach. Specifically, the fourth request message may be at least one message in at least one of the foregoing signaling flows. For example, the fourth request message may be a paging message or an access message, or may be any other messages carrying the IMEI. Using a UMTS communications network as an example, in a paging signaling flow, the fourth request message may be a paging (Paging) message, and the paging message carries the IMEI. A specific form of the fourth request message is not limited in the present application.

Step 802: The network side device connects the terminal device to a network according to the fourth request message.

In this embodiment, each terminal device has a globally unique IMEI. Therefore, the IMEI corresponds to the terminal device in a one-to-one manner. After receiving the fourth request message that is sent by the terminal device and that carries the IMEI, the network side device identifies the terminal device according to the IMEI, and connects the terminal device to the network according to the fourth request message. In addition, the network side device may further send a fourth response message to the terminal device, to notify the terminal device that the terminal device is already connected to the network.

By means of the method for identification in a wireless network that is provided in this embodiment of the present application, a network side device receives a fourth request message that is sent by a terminal device and that carries an IMEI, identifies the terminal device according to the IMEI, and connects the terminal device to a network according to the fourth request message. The terminal device is identified by using the IMEI. Therefore, IMSI resource depletion may be avoided, and the terminal device can be normally identified for normal communication.

FIG. 9 is a schematic structural diagram of Embodiment 1 of an apparatus for identification in a wireless network according to the present application. As shown in FIG. 9, the apparatus for identification in a wireless network that is provided in this embodiment of the present application includes a receiving module 11, a determining module 12, and a sending module 13.

The receiving module 11 is configured to receive a first request message sent by a network side device. The first request message carries an international mobile equipment identity IMEI, and the IMEI is used to identify a terminal device. The determining module 12 is configured to determine whether the IMEI is the same as an IMEI of the terminal device. The sending module 13 is configured to: when the determining module determines that the IMEI is the same as the IMEI of the terminal device, send a first response message to the network side device, so that the network side device connects the terminal device to a network according to the first response message.

By means of the apparatus for identification in a wireless network that is provided in this embodiment of the present application, a terminal device receives a first request message that is sent by a network side device and that carries an IMEI, and sends a first response message to the network side devices when determining that the IMEI is the same as an IMEI of the terminal device, so that the network side device connects the terminal device to a network according to the first response message. The terminal device is identified by using the IMEI. Therefore, IMSI resource depletion may be avoided, and the terminal device can be normally identified for normal communication.

Optionally, the IMEI corresponds to the terminal device in a one-to-one manner.

Optionally, the first request message includes a message in at least one of the following signaling flows: paging, access, service establishment, location area update, routing area update, attach, or detach.

The apparatus for identification in a wireless network that is provided in this embodiment may be configured to execute a technical solution in a method for identification in a wireless network that is provided in any embodiment of the present application. Their implementation principles and technical effects are similar, and details are not described herein again.

FIG. 10 is a schematic structural diagram of Embodiment 2 of an apparatus for identification in a wireless network according to the present application. As shown in FIG. 10, the apparatus for identification in a wireless network that is provided in this embodiment of the present application includes a sending module 21, a receiving module 22, and a processing module 23.

The sending module 21 is configured to send a first request message to user equipment and/or a terminal device. The first request message carries an international mobile equipment identity IMEI, and the IMEI is used to identify the terminal device. The receiving module 22 is configured to receive a first response message sent by the terminal device. The first response message is a message sent by the terminal device when the terminal device determines that the IMEI is the same as an IMEI of the terminal device. The processing module 23 is configured to connect the terminal device to a network according to the first response message.

By means of the apparatus for identification in a wireless network that is provided in this embodiment of the present application, a network side device sends, to a terminal device, a first request message carrying an IMEI, receives a first response message sent by the terminal device, and connects the terminal device to a network according to the received first response message. The terminal device is identified by using the IMEI. Therefore, IMSI resource depletion may be avoided, and the terminal device can be normally identified for normal communication.

Optionally, the IMEI corresponds to the terminal device in a one-to-one manner.

Optionally, the first request message includes a message in at least one of the following signaling flows: paging, access, service establishment, location area update, routing area update, attach, or detach.

The apparatus for identification in a wireless network that is provided in this embodiment may be configured to execute a technical solution in a method for identification in a wireless network that is provided in any embodiment of the present application. Their implementation principles and technical effects are similar, and details are not described herein again.

FIG. 11 is a schematic structural diagram of Embodiment 3 of an apparatus for identification in a wireless network according to the present application. As shown in FIG. 11, the apparatus for identification in a wireless network that is provided in this embodiment of the present application includes a receiving module 31, a determining module 32, and a sending module 33.

The receiving module 31 is configured to receive a second request message sent by a network side device. The second request message carries an international mobile subscriber identity IMSI, the IMSI is used to identify the terminal device, and the IMSI includes an X-bit mobile subscriber identification number MSIN. X is a positive integer greater than 10. The determining module 32 is configured to determine whether the IMSI is the same as an IMSI of the terminal device. The sending module 33 is configured to: when the determining module determines that the IMSI is the same as the IMSI of the terminal device, send a second response message to the network side device, so that the network side device connects the terminal device to a network according to the second response message.

By means of the apparatus for identification in a wireless network that is provided in this embodiment of the present application, a terminal device receives a second request message that is sent by a network side device and that carries an IMSI, and sends a second response message to the network side devices when determining that the IMSI is the same as an IMSI of the terminal device, so that the network side device connects the terminal device to a network according to the second response message. A quantity of bits of an MSIN in the IMSI is extended, so that the IMSI may identify more terminal devices. Therefore, a phenomenon of IMSI resource depletion is avoided, and the terminal device can be normally identified for normal communication.

Optionally, the IMSI corresponds to the terminal device in a one-to-one manner.

Optionally, the second request message includes a message in at least one of the following signaling flows: paging, access, service establishment, location area update, routing area update, attach, or detach.

The apparatus for identification in a wireless network that is provided in this embodiment may be configured to execute a technical solution in a method for identification in a wireless network that is provided in any embodiment of the present application. Their implementation principles and technical effects are similar, and details are not described herein again.

Figure 12:
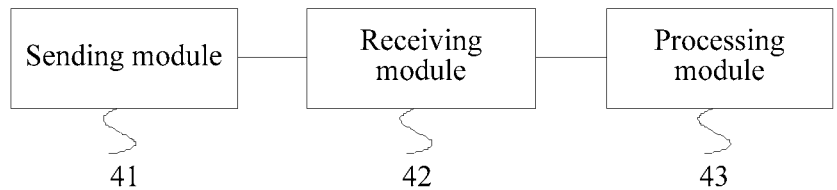
FIG. 12 is a schematic structural diagram of Embodiment 4 of an apparatus for identification in a wireless network according to the present application.

FIG. 12 is a schematic structural diagram of Embodiment 4 of an apparatus for identification in a wireless network according to the present application. As shown in FIG. 12, the apparatus for identification in a wireless network that is provided in this embodiment of the present application includes a sending module 41, a receiving module 42, and a processing module 43.

The sending module 41 is configured to send a second request message to user equipment and/or a terminal device. The second request message carries an international mobile subscriber identity IMSI, the IMSI is used to identify the terminal device, and the IMSI includes an X-bit mobile subscriber identification number MSIN. X is a positive integer greater than 10. The receiving module 42 is configured to receive a second response message sent by the terminal device. The second response message is a message sent by the terminal device when the terminal device determines that the IMSI is the same as an IMSI of the terminal device. The processing module 43 is configured to connect the terminal device to a network according to the second response message.

By means of the apparatus for identification in a wireless network that is provided in this embodiment of the present application, a network side device sends, to a terminal device, a second request message carrying an IMSI, receives a second response message that is sent by the terminal device to the network side device when the terminal device determines that the IMSI is the same as an IMSI of the terminal device, and connects the terminal device to a network according to the second response message. A quantity of bits of an MSIN in the IMSI is extended, so that the IMSI may identify more terminal devices. Therefore, a phenomenon of IMSI resource depletion is avoided, and the terminal device can be normally identified for normal communication.

Optionally, the IMSI corresponds to the terminal device in a one-to-one manner.

Optionally, the second request message includes a message in at least one of the following signaling flows: paging, access, service establishment, location area update, routing area update, attach, or detach.

The apparatus for identification in a wireless network that is provided in this embodiment may be configured to execute a technical solution in a method for identification in a wireless network that is provided in any embodiment of the present application. Their implementation principles and technical effects are similar, and details are not described herein again.

Figure 13:
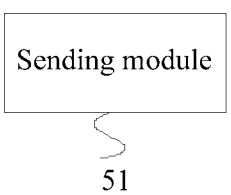
FIG. 13 is a schematic structural diagram of Embodiment 5 of an apparatus for identification in a wireless network according to the present application.

FIG. 13 is a schematic structural diagram of Embodiment 5 of an apparatus for identification in a wireless network according to the present application. As shown in FIG. 13, the apparatus for identification in a wireless network that is provided in this embodiment of the present application includes a sending module 51.

The sending module 51 is configured to send a third request message to a network side device. The third request message carries an international mobile subscriber identity IMSI, so that the network side device identifies a terminal device according to the IMSI, and connects the terminal device to a network according to the third request message; the IMSI is used to identify the terminal device; and the IMSI includes an X-bit mobile subscriber identification number MSIN. X is a positive integer greater than 10.

By means of the apparatus for identification in a wireless network that is provided in this embodiment of the present application, a terminal device sends, to a network side device, a third request message carrying an IMSI, so that the network side device connects the terminal device to a network according to the third request message. A quantity of bits of an MSIN in the IMSI is extended, so that the IMSI may identify more terminal devices. Therefore, a phenomenon of IMSI resource depletion is avoided, and the terminal device can be normally identified for normal communication.

Optionally, the IMSI corresponds to the terminal device in a one-to-one manner.

Optionally, the third request message includes a message in at least one of the following signaling flows: paging, access, service establishment, location area update, routing area update, attach, or detach.

The apparatus for identification in a wireless network that is provided in this embodiment may be configured to execute a technical solution in a method for identification in a wireless network that is provided in any embodiment of the present application. Their implementation principles and technical effects are similar, and details are not described herein again.

Figure 14:
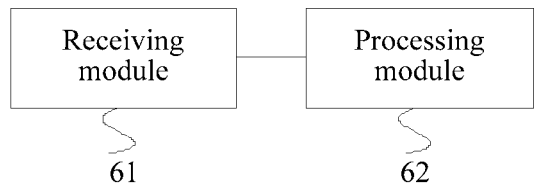
FIG. 14 is a schematic structural diagram of Embodiment 6 of an apparatus for identification in a wireless network according to the present application.

FIG. 14 is a schematic structural diagram of Embodiment 6 of an apparatus for identification in a wireless network according to the present application. As shown in FIG. 14, the apparatus for identification in a wireless network that is provided in this embodiment of the present application includes a receiving module 61 and a processing module 62.

The receiving module 61 is configured to receive a third request message sent by a terminal device. The third request message carries an international mobile subscriber identity IMSI, the IMSI is used to identify the terminal device, and the IMSI includes an X-bit mobile subscriber identification number MSIN. X is a positive integer greater than 10. The processing module 62 is configured to connect the terminal device to a network according to the third request message.

By means of the apparatus for identification in a wireless network that is provided in this embodiment of the present application, a network side device receives a third request message that is sent by a terminal device and that carries an IMSI, and connects the terminal device to a network according to the third request message. A quantity of bits of an MSIN in the IMSI is extended, so that the IMSI may identify more terminal devices. Therefore, a phenomenon of IMSI resource depletion is avoided, and the terminal device can be normally identified for normal communication.

Optionally, the IMSI corresponds to the terminal device in a one-to-one manner.

Optionally, the third request message includes a message in at least one of the following signaling flows: paging, access, service establishment, location area update, routing area update, attach, or detach.

The apparatus for identification in a wireless network that is provided in this embodiment may be configured to execute a technical solution in a method for identification in a wireless network that is provided in any embodiment of the present application. Their implementation principles and technical effects are similar, and details are not described herein again.

Figure 15:
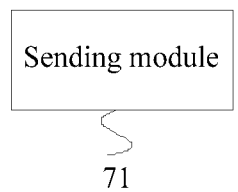
FIG. 15 is a schematic structural diagram of Embodiment 7 of an apparatus for identification in a wireless network according to the present application.

FIG. 15 is a schematic structural diagram of Embodiment 7 of an apparatus for identification in a wireless network according to the present application. As shown in FIG. 15, the apparatus for identification in a wireless network that is provided in this embodiment of the present application includes a sending module 71.

The sending module 71 is configured to send a fourth request message to a network side device. The fourth request message carries an international mobile equipment identity IMEI, so that the network side device identifies a terminal device according to the IMEI, and connects the terminal device to a network according to the fourth request message; and the IMEI is used to identify the terminal device.

By means of the apparatus for identification in a wireless network that is provided in this embodiment of the present application, a terminal device sends, to a network side device, a fourth request message carrying an IMEI, so that the network side device identifies the terminal device according to the IMEI, and connects the terminal device to a network according to the fourth request message. The terminal device is identified by using the IMEI. Therefore, IMSI resource depletion may be avoided, and the terminal device can be normally identified for normal communication.

Optionally, the IMEI corresponds to the terminal device in a one-to-one manner.

Optionally, the fourth request message includes a message in at least one of the following signaling flows: paging, access, service establishment, location area update, routing area update, attach, or detach.

The apparatus for identification in a wireless network that is provided in this embodiment may be configured to execute a technical solution in a method for identification in a wireless network that is provided in any embodiment of the present application. Their implementation principles and technical effects are similar, and details are not described herein again.

Figure 16:
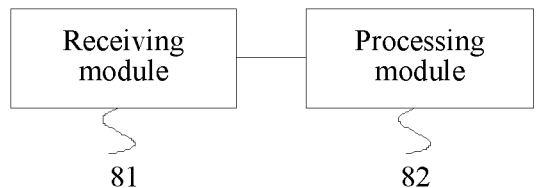
FIG. 16 is a schematic structural diagram of Embodiment 8 of an apparatus for identification in a wireless network according to the present application.

FIG. 16 is a schematic structural diagram of Embodiment 8 of an apparatus for identification in a wireless network according to the present application. As shown in FIG. 16, the apparatus for identification in a wireless network that is provided in this embodiment of the present application includes a receiving module 81 and a processing module 82.

The receiving module 81 is configured to receive a fourth request message sent by a terminal device. The fourth request message carries an international mobile equipment identity IMEI, and the IMEI is used to identify the terminal device. The processing module 82 is configured to connect the terminal device to a network according to the fourth request message.

By means of the apparatus for identification in a wireless network that is provided in this embodiment of the present application, a network side device receives a fourth request message that is sent by a terminal device and that carries an IMEI, identifies the terminal device according to the IMEI, and connects the terminal device to a network according to the fourth request message. The terminal device is identified by using the IMEI. Therefore, IMSI resource depletion may be avoided, and the terminal device can be normally identified for normal communication.

Optionally, the IMEI corresponds to the terminal device in a one-to-one manner.

Optionally, the fourth request message includes a message in at least one of the following signaling flows: paging, access, service establishment, location area update, routing area update, attach, or detach.

The apparatus for identification in a wireless network that is provided in this embodiment may be configured to execute a technical solution in a method for identification in a wireless network that is provided in any embodiment of the present application. Their implementation principles and technical effects are similar, and details are not described herein again.

Figure 17:
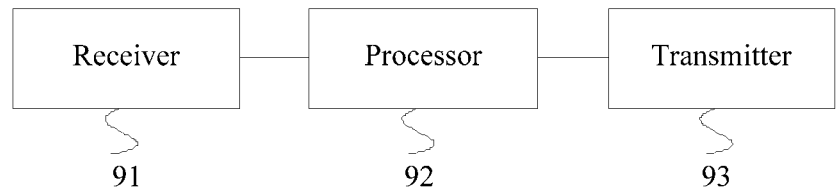
FIG. 17 is a schematic structural diagram of Embodiment 1 of a terminal device according to the present application.

FIG. 17 is a schematic structural diagram of Embodiment 1 of a terminal device according to the present application. As shown in FIG. 17, the terminal device provided in this embodiment of the present application includes a receiver 91, a processor 92, and a transmitter 93.

The receiver 91 is configured to receive a first request message sent by a network side device. The first request message carries an international mobile equipment identity IMEI, and the IMEI is used to identify the terminal device. The processor 92 is configured to determine whether the IMEI is the same as an IMEI of the terminal device. The transmitter 93 is configured to: when the processor 92 determines that the IMEI is the same as the IMEI of the terminal device, send a first response message to the network side device, so that the network side device connects the terminal device to a network according to the first response message.

The terminal device provided in this embodiment may be configured to execute a technical solution in a method for identification in a wireless network that is provided in any embodiment of the present application. Their implementation principles and technical effects are similar, and details are not described herein again.

Optionally, the IMEI corresponds to the terminal device in a one-to-one manner.

Optionally, the first request message includes a message in at least one of the following signaling flows: paging, access, service establishment, location area update, routing area update, attach, or detach.

The terminal device provided in this embodiment may be configured to execute a technical solution in a method for identification in a wireless network that is provided in any embodiment of the present application. Their implementation principles and technical effects are similar, and details are not described herein again.

Figure 18:
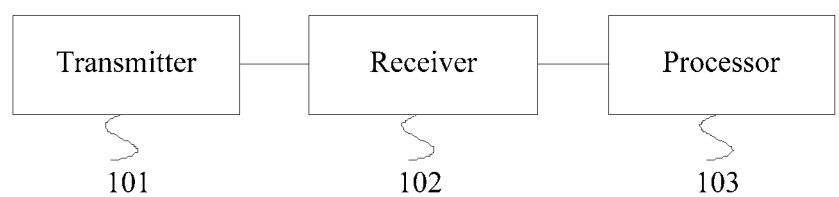
FIG. 18 is a schematic structural diagram of Embodiment 1 of a network side device according to the present application.

FIG. 18 is a schematic structural diagram of Embodiment 1 of a network side device according to the present application. As shown in FIG. 18, the network side device provided in this embodiment of the present application includes a transmitter 101, a receiver 102, and a processor 103.

The transmitter 101 is configured to send a first request message to user equipment and/or a terminal device. The first request message carries an international mobile equipment identity IMEI, and the IMEI is used to identify the terminal device. The receiver 102 is configured to receive a first response message sent by the terminal device. The first response message is a message sent by the terminal device when the terminal device determines that the IMEI is the same as an IMEI of the terminal device. The processor 103 is configured to connect the terminal device to a network according to the first response message.

The network side device provided in this embodiment may be configured to execute a technical solution in a method for identification in a wireless network that is provided in any embodiment of the present application. Their implementation principles and technical effects are similar, and details are not described herein again.

Optionally, the IMEI corresponds to the terminal device in a one-to-one manner.

Optionally, the first request message includes a message in at least one of the following signaling flows: paging, access, service establishment, location area update, routing area update, attach, or detach.

The network side device provided in this embodiment may be configured to execute a technical solution in a method for identification in a wireless network that is provided in any embodiment of the present application. Their implementation principles and technical effects are similar, and details are not described herein again.

Figure 19:
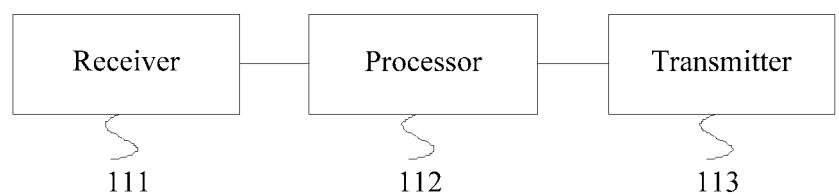
FIG. 19 is a schematic structural diagram of Embodiment 2 of a terminal device according to the present application.

FIG. 19 is a schematic structural diagram of Embodiment 2 of a terminal device according to the present application. As shown in FIG. 19, the terminal device provided in this embodiment of the present application includes a receiver 111, a processor 112, and a transmitter 113.

The receiver 111 is configured to receive a second request message sent by a network side device. The second request message carries an international mobile subscriber identity IMSI, the IMSI is used to identify the terminal device, and the IMSI includes an X-bit mobile subscriber identification number MSIN. X is a positive integer greater than 10. The processor 112 is configured to determine whether the IMSI is the same as an IMSI of the terminal device. The transmitter 113 is configured to: when the processor 112 determines that the IMSI is the same as the IMSI of the terminal device, send a second response message to the network side device, so that the network side device connects the terminal device to a network according to the second response message.

The terminal device provided in this embodiment may be configured to execute a technical solution in a method for identification in a wireless network that is provided in any embodiment of the present application. Their implementation principles and technical effects are similar, and details are not described herein again.

Optionally, the IMSI corresponds to the terminal device in a one-to-one manner.

Optionally, the second request message includes a message in at least one of the following signaling flows: paging, access, service establishment, location area update, routing area update, attach, or detach.

The terminal device provided in this embodiment may be configured to execute a technical solution in a method for identification in a wireless network that is provided in any embodiment of the present application. Their implementation principles and technical effects are similar, and details are not described herein again.

Figure 20:
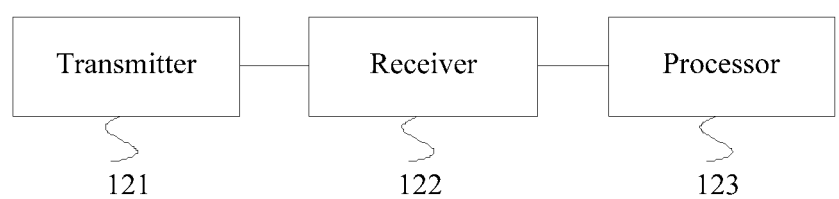
FIG. 20 is a schematic structural diagram of Embodiment 2 of a network side device according to the present application.

FIG. 20 is a schematic structural diagram of Embodiment 2 of a network side device according to the present application. As shown in FIG. 20, the network side device provided in this embodiment of the present application includes a transmitter 121, a receiver 122, and a processor 123.

The transmitter 121 is configured to send a second request message to user equipment and/or a terminal device. The second request message carries an international mobile subscriber identity IMSI, the IMSI is used to identify the terminal device, and the IMSI includes an X-bit mobile subscriber identification number MSIN. X is a positive integer greater than 10. The receiver 122 is configured to receive a second response message sent by the terminal device. The second response message is a message sent by the terminal device when the terminal device determines that the IMSI is the same as an IMSI of the terminal device. The processor 123 is configured to connect the terminal device to a network according to the second response message.

The network side device provided in this embodiment may be configured to execute a technical solution in a method for identification in a wireless network that is provided in any embodiment of the present application. Their implementation principles and technical effects are similar, and details are not described herein again.

Optionally, the IMSI corresponds to the terminal device in a one-to-one manner.

Optionally, the second request message includes a message in at least one of the following signaling flows: paging, access, service establishment, location area update, routing area update, attach, or detach.

The network side device provided in this embodiment may be configured to execute a technical solution in a method for identification in a wireless network that is provided in any embodiment of the present application. Their implementation principles and technical effects are similar, and details are not described herein again.

Figure 21:
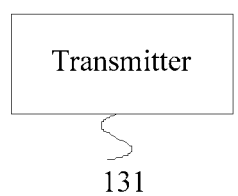
FIG. 21 is a schematic structural diagram of Embodiment 3 of a terminal device according to the present application.

FIG. 21 is a schematic structural diagram of Embodiment 3 of a terminal device according to the present application. As shown in FIG. 21, the terminal device provided in this embodiment of the present application includes a transmitter 131.

The transmitter 131 is configured to send a third request message to a network side device. The third request message carries an international mobile subscriber identity IMSI, so that the network side device identifies the terminal device according to the IMSI, and connects the terminal device to a network according to the third request message; the IMSI is used to identify the terminal device; and the IMSI includes an X-bit mobile subscriber identification number MSIN. X is a positive integer greater than 10.

The terminal device provided in this embodiment may be configured to execute a technical solution in a method for identification in a wireless network that is provided in any embodiment of the present application. Their implementation principles and technical effects are similar, and details are not described herein again.

Optionally, the IMSI corresponds to the terminal device in a one-to-one manner.

Optionally, the third request message includes a message in at least one of the following signaling flows: paging, access, service establishment, location area update, routing area update, attach, or detach.

The terminal device provided in this embodiment may be configured to execute a technical solution in a method for identification in a wireless network that is provided in any embodiment of the present application. Their implementation principles and technical effects are similar, and details are not described herein again.

Figure 22:
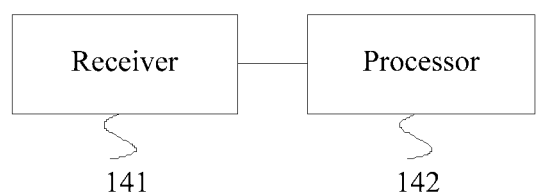
FIG. 22 is a schematic structural diagram of Embodiment 3 of a network side device according to the present application.

FIG. 22 is a schematic structural diagram of Embodiment 3 of a network side device according to the present application. As shown in FIG. 22, the network side device provided in this embodiment of the present application includes a receiver 141 and a processor 142.

The receiver 141 is configured to receive a third request message sent by a terminal device. The third request message carries an international mobile subscriber identity IMSI, the IMSI is used to identify the terminal device, and the IMSI includes an X-bit mobile subscriber identification number MSIN. X is a positive integer greater than 10. The processor 142 is configured to connect the terminal device to a network according to the third request message.

The network side device provided in this embodiment may be configured to execute a technical solution in a method for identification in a wireless network that is provided in any embodiment of the present application. Their implementation principles and technical effects are similar, and details are not described herein again.

Optionally, the IMSI corresponds to the terminal device in a one-to-one manner.

Optionally, the third request message includes a message in at least one of the following signaling flows: paging, access, service establishment, location area update, routing area update, attach, or detach.

The network side device provided in this embodiment may be configured to execute a technical solution in a method for identification in a wireless network that is provided in any embodiment of the present application. Their implementation principles and technical effects are similar, and details are not described herein again.

Figure 23:
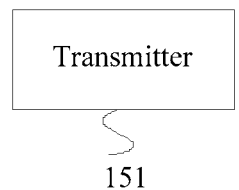
FIG. 23 is a schematic structural diagram of Embodiment 4 of a terminal device according to the present application.

FIG. 23 is a schematic structural diagram of Embodiment 4 of a terminal device according to the present application. As shown in FIG. 23, the terminal device provided in this embodiment of the present application includes a transmitter 151.

The transmitter 151 is configured to send a fourth request message to a network side device. The fourth request message carries an international mobile equipment identity IMEI, so that the network side device identifies the terminal device according to the IMEI, and connects the terminal device to a network according to the fourth request message; and the IMEI is used to identify the terminal device.

The terminal device provided in this embodiment may be configured to execute a technical solution in a method for identification in a wireless network that is provided in any embodiment of the present application. Their implementation principles and technical effects are similar, and details are not described herein again.

Optionally, the IMEI corresponds to the terminal device in a one-to-one manner.

Optionally, the fourth request message includes a message in at least one of the following signaling flows: paging, access, service establishment, location area update, routing area update, attach, or detach.

The terminal device provided in this embodiment may be configured to execute a technical solution in a method for identification in a wireless network that is provided in any embodiment of the present application. Their implementation principles and technical effects are similar, and details are not described herein again.

Figure 24:
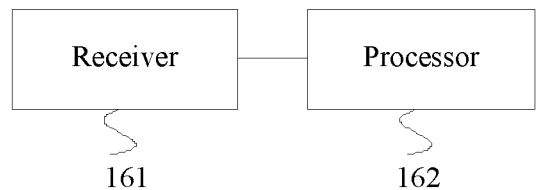
FIG. 24 is a schematic structural diagram of Embodiment 1 of a network side device according to the present application.

FIG. 24 is a schematic structural diagram of Embodiment 1 of a network side device according to the present application. As shown in FIG. 24, the network side device provided in this embodiment of the present application includes a receiver 161 and a processor 162.

The receiver 161 is configured to receive a fourth request message sent by a terminal device. The fourth request message carries an international mobile equipment identity IMEI, and the IMEI is used to identify the terminal device. The processor 162 is configured to connect the terminal device to a network according to the fourth request message.

The network side device provided in this embodiment may be configured to execute a technical solution in a method for identification in a wireless network that is provided in any embodiment of the present application. Their implementation principles and technical effects are similar, and details are not described herein again.

Optionally, the IMEI corresponds to the terminal device in a one-to-one manner.

Optionally, the fourth request message includes a message in at least one of the following signaling flows: paging, access, service establishment, location area update, routing area update, attach, or detach.

The network side device provided in this embodiment may be configured to execute a technical solution in a method for identification in a wireless network that is provided in any embodiment of the present application. Their implementation principles and technical effects are similar, and details are not described herein again.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A network side device, comprising:
a transmitter, the transmitter configured to send a request message to a terminal device, wherein the request message includes an international mobile equipment identity (IMEI), wherein the IMEI is used to identify the terminal device, and wherein the request message comprises a message in at least one of the following signaling flows: access, service establishment, location area update, routing area update, attach, or detach;
a receiver, the receiver configured to receive a response message sent by the terminal device, wherein the response message is a message sent by the terminal device in response to the terminal device determining that the IMEI in the request message is the same as an IMEI of the terminal device, wherein the response message is a radio resource control (RRC) connection request message; and
at least one processor, the at least one processor configured to connect the terminal device to a network in response to receiving the response message.

2. The network side device according to claim 1, wherein the IMEI corresponds to the terminal device in a one-to-one manner.

3. The network side device according to claim 1, wherein the request message is an access message.

4. A terminal device, comprising:
a receiver, the receiver configured to receive a request message sent by a network side device, wherein the request message includes an international mobile subscriber identity (IMSI), wherein the IMSI is used to identify the terminal device, wherein the IMSI comprises an X-bit mobile subscriber identification number (MSIN), wherein X is a positive integer greater than 10, and wherein the request message comprises a message in at least one of the following signaling flows: access, service establishment, location area update, routing area update, attach, or detach;

at least one processor, the at least one processor configured to determine whether the IMSI in the request message is the same as an IMSI of the terminal device; and a transmitter, the transmitter configured to, in response to the at least one processor determining that the IMSI in the request message is the same as the IMSI of the terminal device, send a response message to the network side device, wherein the response message is a radio resource control (RRC) connection request message.

5. The terminal device according to claim 4, wherein the IMSI corresponds to the terminal device in a one-to-one manner.

6. The terminal device according to claim 4, wherein the request message is an access message.

7. A network side device, comprising:

a transmitter, the transmitter configured to send a request message to a terminal device, wherein the request message includes an international mobile subscriber identity (IMSI), wherein the IMSI is used to identify the terminal device, wherein the IMSI comprises an X-bit mobile subscriber identification number (MSIN), wherein X is a positive integer greater than 10, and wherein the request message comprises a message in at least one of the following signaling flows: access, service establishment, location area update, routing area update, attach, or detach;

a receiver, the receiver configured to receive a response message sent by the terminal device, wherein the response message is a message sent by the terminal device in response to the terminal device determining that the IMSI in the request message is the same as an IMSI of the terminal device, wherein the response message is a radio resource control (RRC) connection request message; and at least one processor, the at least one processor configured to connect the terminal device to a network in response to receiving the response message.

8. The network side device according to claim 7, wherein the IMSI corresponds to the terminal device in a one-to-one manner.

9. The network side device according to claim 7, wherein the request message is an access message.

* * * * *